United States Patent
Ma

(10) Patent No.: US 6,780,024 B2
(45) Date of Patent: Aug. 24, 2004

(54) ELECTRICAL CONNECTOR HAVING REINFORCEMENT PLATE

(75) Inventor: Hao-Yun Ma, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/407,508

(22) Filed: Apr. 4, 2003

(65) Prior Publication Data

US 2004/0115965 A1 Jun. 17, 2004

(30) Foreign Application Priority Data

Dec. 13, 2002 (TW) ...................................... 91220212 U

(51) Int. Cl.[7] ............................................. H01R 13/639
(52) U.S. Cl. ...................................... 439/73; 439/330
(58) Field of Search ........................ 439/73, 330, 331, 439/342, 525, 526

(56) References Cited

U.S. PATENT DOCUMENTS

| | | | | |
|---|---|---|---|---|
| 3,831,131 A | * | 8/1974 | Woodcock et al. | ......... 439/331 |
| 4,204,722 A | * | 5/1980 | Yasui et al. | ................. 439/331 |
| 4,502,747 A | * | 3/1985 | Bright et al. | ................ 439/331 |
| 5,192,213 A | | 3/1993 | Kosugi et al. | |
| 5,199,889 A | | 4/1993 | McDevitt, Jr. | |
| 5,232,372 A | | 8/1993 | Bradley et al. | |
| 5,310,350 A | * | 5/1994 | Matsuoka et al. | .......... 439/525 |
| 5,320,559 A | | 6/1994 | Uratsuji et al. | |
| 5,362,241 A | | 11/1994 | Matsuoka et al. | |

* cited by examiner

Primary Examiner—Renee Luebke
(74) Attorney, Agent, or Firm—Wei Te Chung

(57) ABSTRACT

An electrical connector (1) includes a base (11) receiving contacts therein, an actuator lever (15), and a frame (14) hinged with the base. The base defines orientation slots (1141). Each orientation slot includes a guide channel (1142) and a fastening channel (1143). A reinforcement plate (12) includes fastening locks (121). Each fastening lock includes a connecting portion (122), and a distal fastening portion (123). When the reinforcement plate is attached onto the base, the fastening locks are initially received in the guide channels. The reinforcement plate is then slid horizontally so that the fastening portions are interferingly received in the fastening channels. The reinforcement plate protects the base from bending or distortion by the frame when the frame presses down on an IC module received in the base. This facilitates reliable electrical connection between the IC module and a PCB on which the base is mounted.

9 Claims, 6 Drawing Sheets

ELECTRICAL CONNECTOR HAVING REINFORCEMENT PLATE

BACKGROUND OF THE INVENTION

1. Field of the Invention

The present invention relates to an electrical connector used for electrically connecting a land grid array (LGA) integrated circuit (IC) module to a printed circuit board (PCB), and particularly to an electrical connector having a reinforcement plate.

2. Description of the Prior Art

An electrical connector used for electrically connecting an LGA IC module to a PCB is widely applied in the field of electronics, and a correlative article is found in *Nonlinear Analysis Helps Design LGA Connectors* (Connector Specifier, February 2001). Example of this kind of electrical connector are disclosed in U.S. Pat. Nos. 5,192,213, 5,199,889, 5,232,372, 5,320,559 and 5,362,241.

Referring to FIG. 6, an conventional electrical connector 9 used for electrically connecting an LGA IC module 8 to a PCB (not shown) comprises a base 91 receiving a plurality of contacts (not shown) therein, an actuator lever 92 having an action portion 95 assembled with one end of the base 91, and a frame 93 hinged with an opposite end of the base 91. The frame 93 is bent slightly at a middle portion thereof, and further forms an end sunken portion 94. The frame 93 is used for pressing and fastening the IC module firmly on the base 91. To fasten the IC module on the base 91 of the electrical connector 9, the action portion 95 of the actuator lever 92 is actuated into the sunken portion 94. The action portion 95 presses the frame 93 on the IC module and the base 91. Because the middle portion of the frame 93 is bent, a middle portion of the base 91 is prone to warp, and the opposite ends of the base 91 are prone to be distorted upwardly where the base 91 joins with the frame 93 and actuator lever 92. Thus the base 91 may partially detach from the PCB. When this happens, electrical connection between the LGA IC module 8 and the PCB may be impaired or even lost.

Hence, a new electrical connector having a reinforcement structure is desired to overcome the above-described disadvantages.

SUMMARY OF THE INVENTION

An object of the present invention is to provide an electrical connector having an effective reinforcement structure to ensure reliable electrical connection between an IC module and a PCB.

In order to achieve the aforementioned object, an electrical connector in accordance with a preferred embodiment of the present invention comprises a base receiving a plurality of contacts therein, an actuator lever assembled with the base, and a frame hinged with the base. The base defines a plurality of orientation slots. Each orientation slot comprises a guide channel perpendicular to the base, and a fastening channel parallel to the base. A reinforcement plate forms a plurality of fastening locks corresponding to the orientation slots. Each fastening lock comprises a connecting portion, and a fastening portion extending from a distal end of the connecting portion. When the reinforcement plate is attached onto the base, the fastening locks are initially received in the guide channels. The reinforcement plate is then slid horizontally so that the fastening portions are interferingly received in the fastening channels. The reinforcement plate protects the base from bending or distortion by the frame when the frame presses down on an IC module received in the base. This facilitates reliable electrical connection between the IC module and a PCB on which the base is mounted.

Other objects, advantages and novel features of the present invention will become more apparent from the following detailed description when taken in conjunction with the accompanying drawings.

DESCRIPTION OF THE PREFERRED EMBODIMENT

Figure 1:
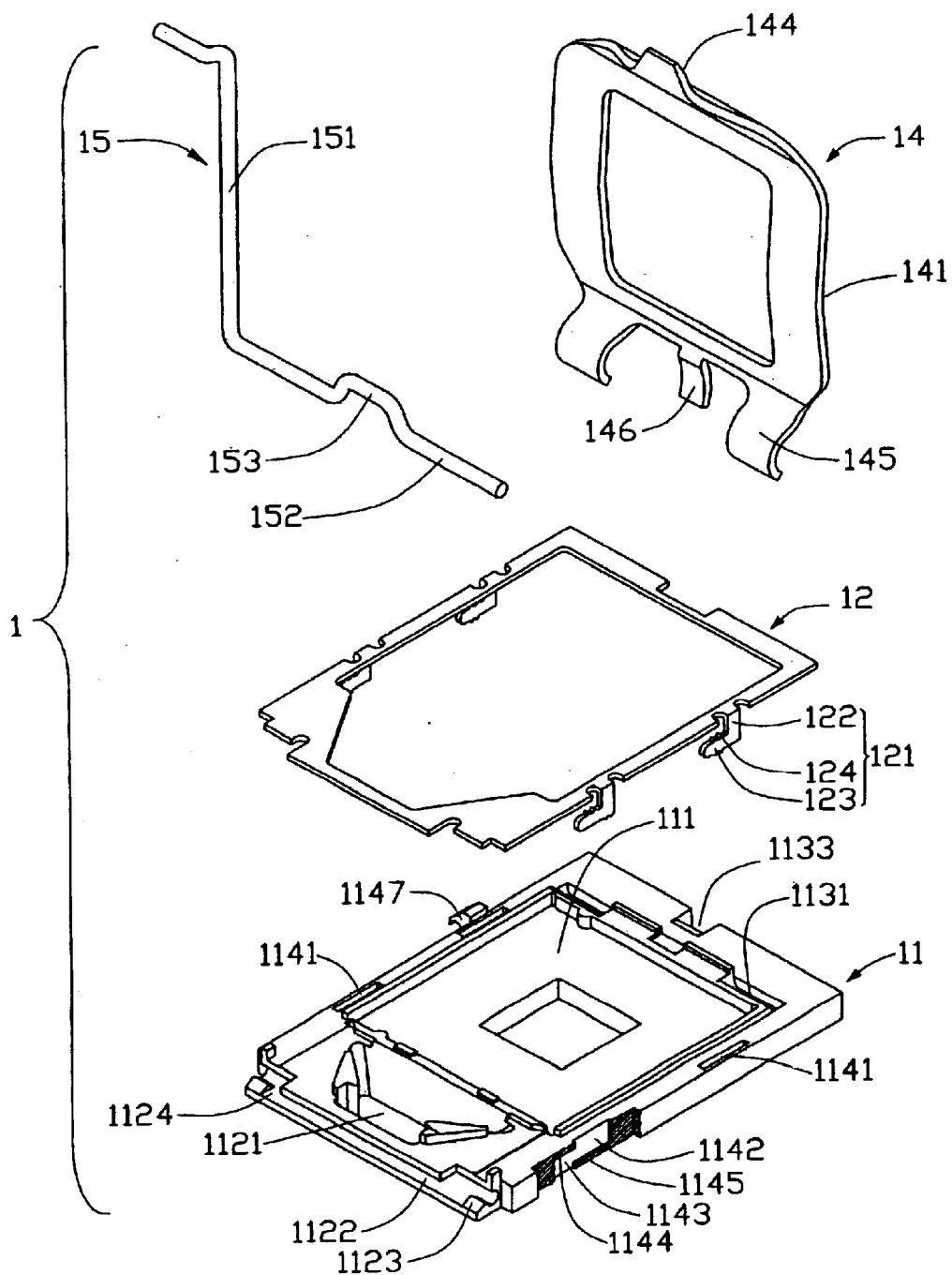
FIG. 1 is an exploded, isometric view of an electrical connector in accordance with the preferred embodiment of the present invention, with part of a base thereof cut away.

Reference will now be made to the drawing figures to describe the present invention in detail.

Referring to FIG. 1, an electrical connector 1 is used for electrically connecting an LGA IC module (not shown) to a PCB (not shown). The connector 1 comprises a base 11 receiving a plurality of contacts (not shown) therein, a reinforcement plate 12 covering on the base 11, a frame 14 hinged with the base 11, and an actuator lever 15 assembled to the base 11. The base 11 defines an electric area 111 used for receiving the contacts. An action cavity 1121 is defined at one end of the base 11 adjacent the electric area 111. The base 11 defines a receiving space 1122 in communication with the action cavity 1121, for receiving the actuator lever 15. The receiving space 1122 is bounded by a bottom surface 1124, and two symmetrical blocks 1123 are formed on opposite sides of the bottom surface 1124 respectively. An opposite end of the base 11 defines a pair of spaced, aligned pivot slots 1131 adjacent the electric area 111. A middle edge portion of said opposite end of the base 11 defines a gap 1133. A restricting block 1147 is formed on one lateral side of the base 11.

A pair of spaced, aligned orientation slots 1141 is defined in each of opposite lateral side walls of the base 11. Each orientation slot 1141 comprises an entry guide channel 1142, and a fastening channel 1143 in communication with the guide channel 1142. The fastening channel 1143 is bounded by an upper wall 1144, and a lower wall 1145 that is parallel to the upper wall 1144.

The reinforcement plate 12 is made of high strength material such as metal, and is substantially a rectangular frame. A pair of spaced, aligned fastening locks 121 depends from each of opposite lateral edges of the reinforcement plate 12, corresponding to the orientation slots 1141 of the base 11. Each fastening lock 121 comprises a proximal connecting portion 122, and a distal fastening portion 123. A plurality of barbs 124 is formed on each of opposite main edges of the connecting portion 122.

Figure 2:
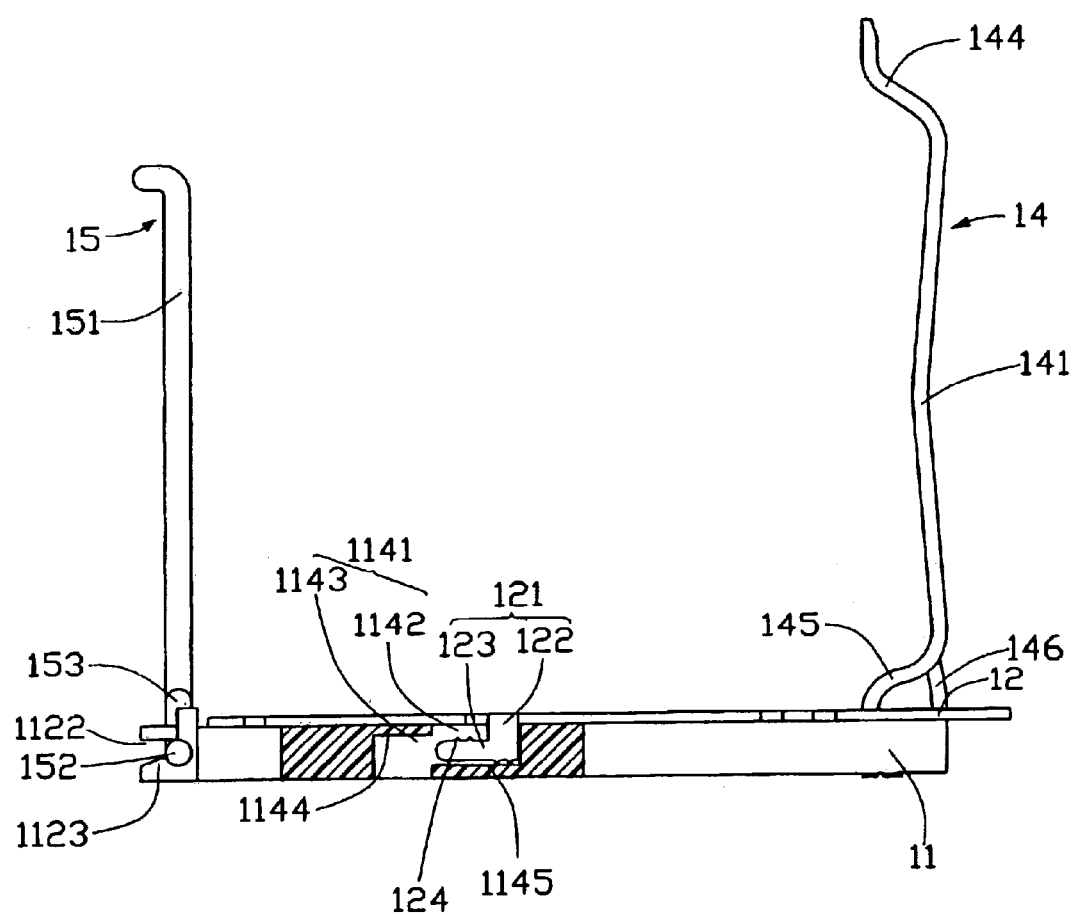
FIG. 2 is an assembled, side elevation view of the electrical connector of FIG. 1, showing a fastening lock of a reinforcement plate of the electrical connector partly received in the base.
Figure 3:
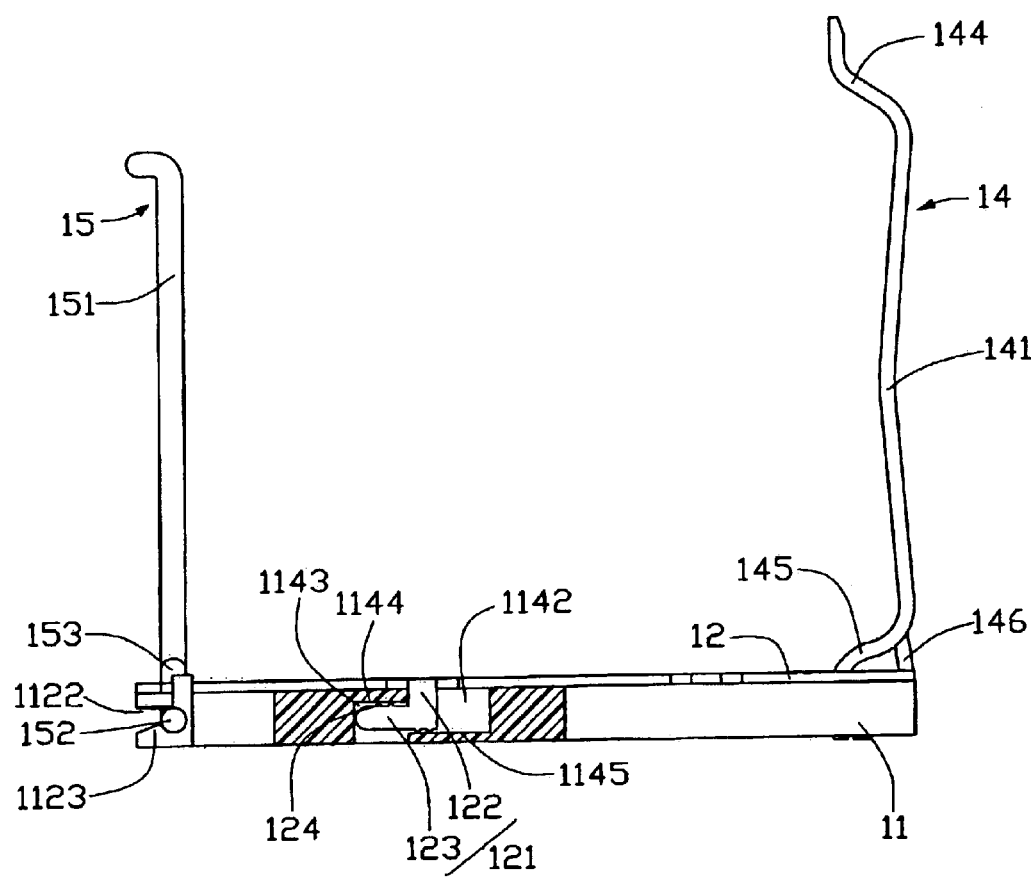
FIG. 3 is similar to FIG. 2, but showing the fastening lock fully and interferingly received in the base.

Referring to FIGS. 2 and 3, when the reinforcement plate 12 and the base 11 are assembled, the fastening locks 121 are received in the orientation slots 1141 via the guide channels 1142, and the reinforcement plate 12 is then slid horizontally so that the fastening portions 123 are interferingly received in the fastening channels 1143. The barbs 124 of the fastening portions 123 interferingly engage with the upper and lower walls 1144, 1145. The reinforcement plate 12 is thus firmly and securely fixed on the base 11.

Figure 4:
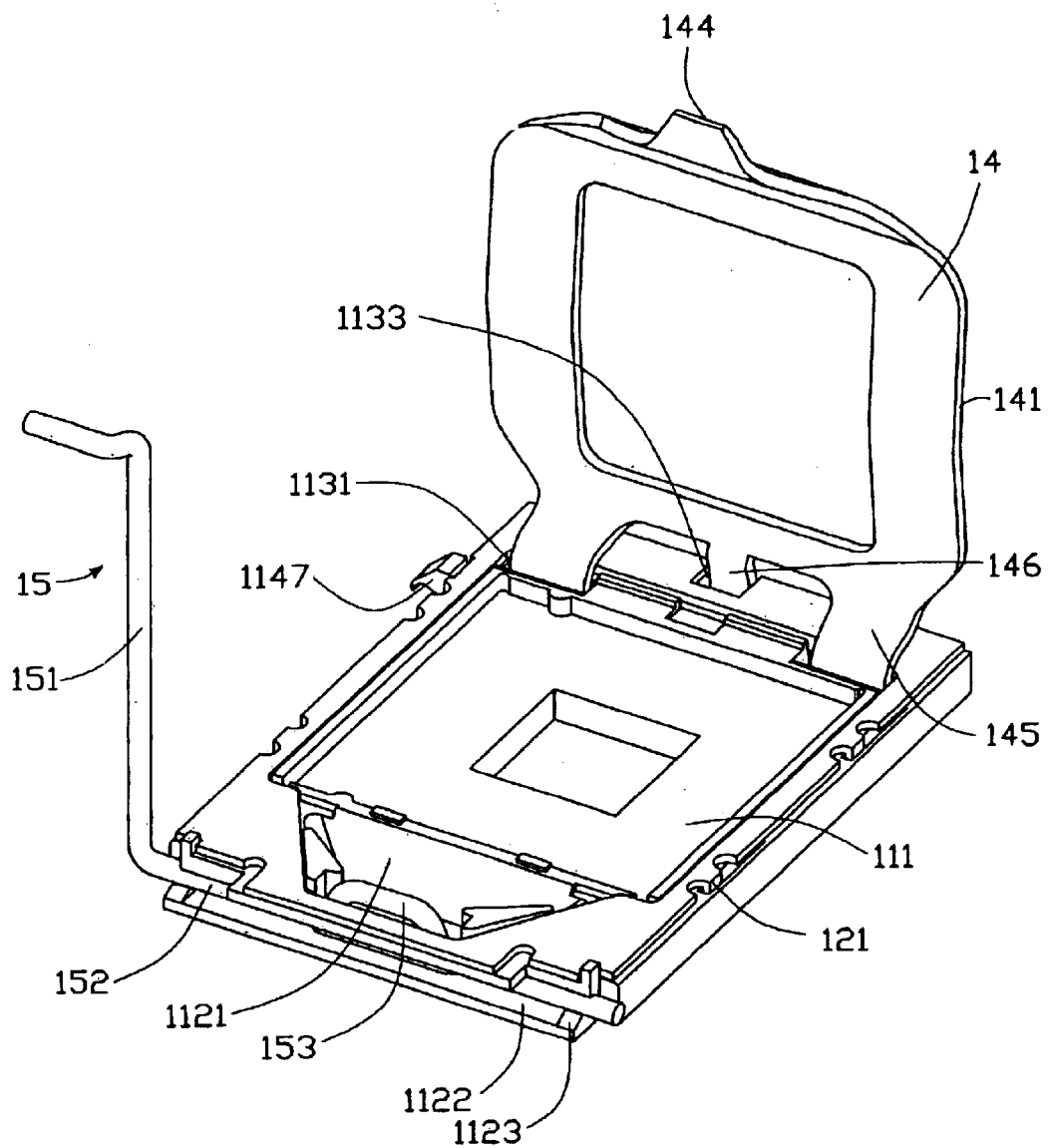
FIG. 4 is an assembled, isometric view of the electrical connector of FIG. 1, showing the electrical connector in an open, unlocked state.
Figure 5:
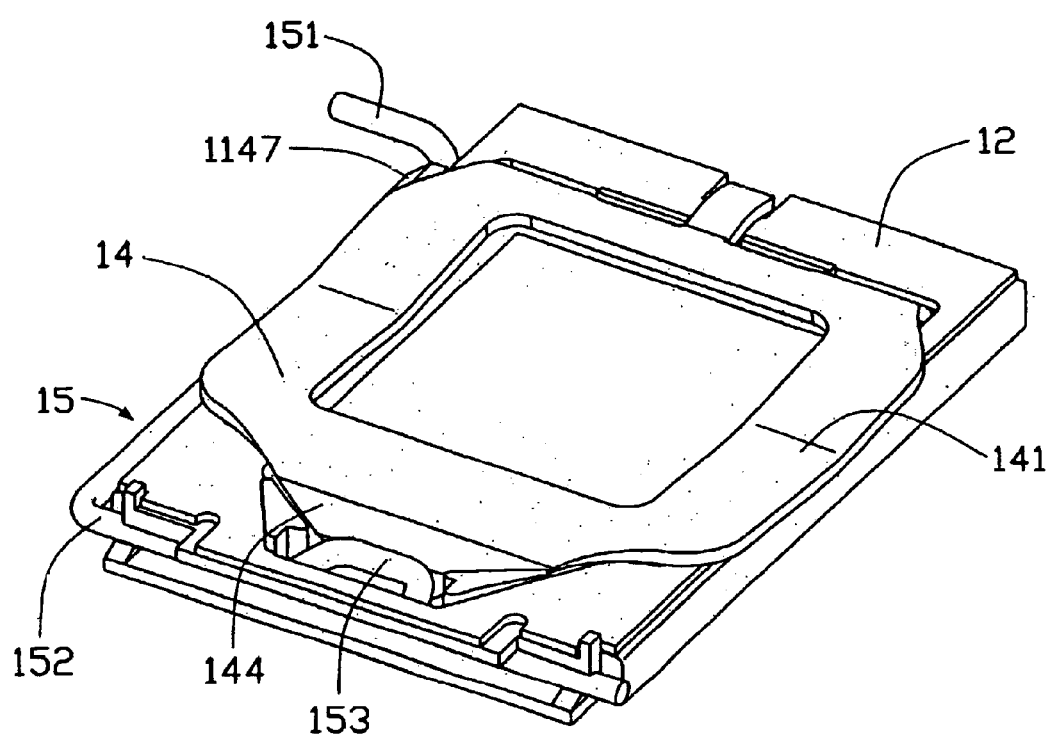
FIG. 5 is similar to FIG. 4, but showing the electrical connector in a closed, locked state.
Figure 6:
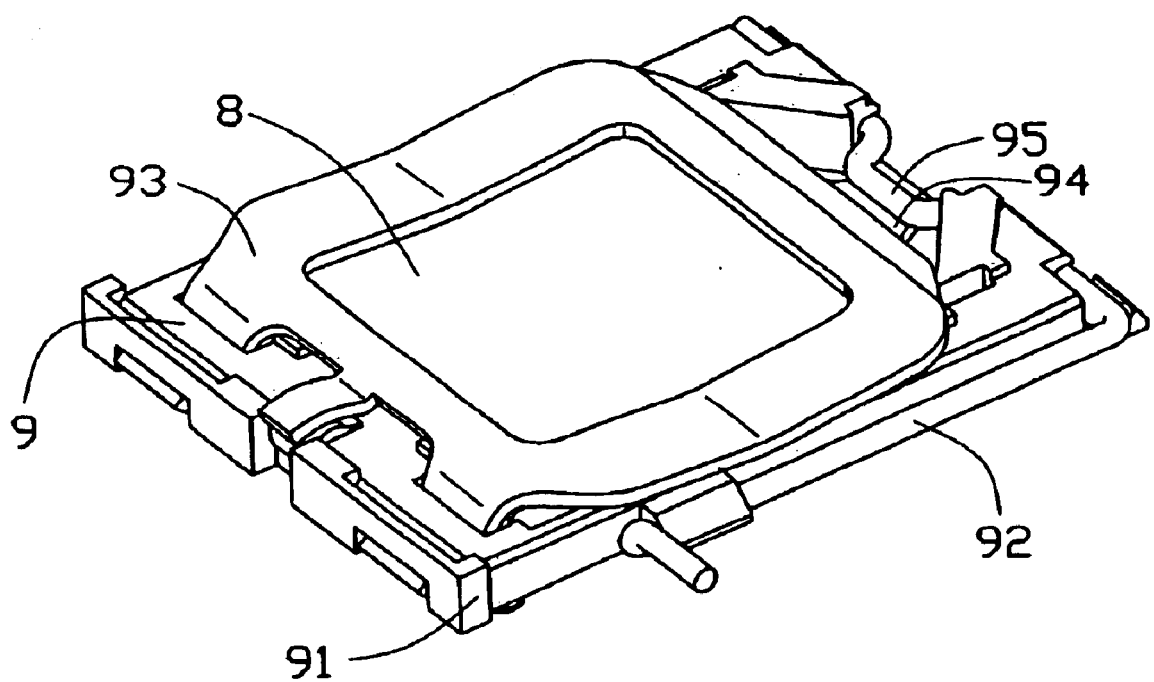
FIG. 6 is an isometric view of a conventional electrical connector.

Referring also to FIGS. 4 and 5, the frame 14 is bent slightly in middle portions of opposite lateral beams thereof, thereby defining two curved suppressing portions 141 respectively. A middle portion of an end beam of the frame 14 forms a sunken portion 144. An opposite end beam of the frame 14 forms two spaced, curved pivot portions 145. A slightly arcuate restricting portion 146 is formed between the pivot portions 145. When the frame 14 and the base 11 are assembled, the pivot portions 145 are movably received in the corresponding pivot slots 1131, and the restricting portion 146 is received in the gap 1133. Thus, the frame 14 is rotatably mounted on the base 11, with movement of the restricting portion 146 restricted by the base 11 at the gap 1133.

The actuator lever 15 comprises an operation handle 151, and an action portion 152 comprising a medial fixing portion 153. The fixing portion 153 is parallel to but offset from a remainder of the action portion 152. When the actuator lever 15 and the base 11 are assembled, the action portion 152 of the actuator lever 15 is received in the receiving space 1122, and is rotatably retained in position by the two blocks 1123.

When the connector 1 is used, the frame 14 is actuated to a vertical position. The LGA IC module (not shown) is positioned on the base 11, and the frame 14 is actuated to press on the LGA IC module. Driven by the operation handle 151, the fixing portion 153 of the action portion 152 presses on the sunken portion 144 of the frame 14, thereby pressing the frame 14 toward and on the LGA IC module. The frame 14 is firmly fastened on the LGA IC module, and as a result, the LGA IC module is securely and reliably fixed on the connector 1.

The reinforcement plate 12 comprehensively covers peripheral portions of the base 11. A strength of the reinforcement plate 12 is much higher than that of the base 11. Thus when the frame 14 is fastened on the LGA IC module, the reinforcement plate 12 helps prevent the base 11 from sustaining bending or deformation. This facilitates reliable electrical connection between the IC module and the PCB on which the base 11 is mounted.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. An electrical connector used for electrically connecting an integrated circuit module to a printed circuit board, comprising:
    a base receiving a plurality of contacts therein and defining a plurality of orientation slots, each of the orientation slots defining a vertical guide channel and a horizontal fastening channel;
    a frame hinged with the base at one end thereof;
    an actuator lever assembled with an opposite end of the base;
    a reinforcement plate covering the base and comprising a plurality of fastening locks corresponding to the orientation slots, each of the fastening locks comprising a connecting portion and a fastening portion extending from a distal end of the connecting portion, the fastening lock being capable of entering a corresponding guide channel and sliding such that the fastening portion engages in the corresponding fastening channel; wherein
    said reinforcement plate is immovable relative to the base in use when said integrated circuit module is assembled to or disassembled from the connector.

2. The electrical connector as described in claim 1, wherein the fastening portion of each of the fastening locks comprises a plurality of barbs interferingly engaging in the fastening channel of the corresponding orientation slot.

3. The electrical connector as described in claim 1, wherein the reinforcement plate is metallic.

4. The electrical connector as described in claim 1, wherein the frame comprises two curved suppressing portions.

5. The electrical connector as described in claim 1, wherein the actuator lever includes an operation handle and an action portion.

6. The electrical connector as described in claim 5, wherein the action portion comprises a fixing portion adapted to cooperate with a sunken portion of the frame such that the fame presses on the integrated circuit module received in the electrical connector.

7. An electrical connector for use with an integrated circuit module, comprising:
    an insulative base defining at least one orientation slot around a periphery region thereof, said at least one slot including a vertical channel upwardly exposed to an exterior and a horizontal channel in communication with said vertical channel;
    a frame hinged to one end of the base;
    an actuator fastening the frame to the base; and
    a reinforcement plate defining at least one fastening lock including a connecting portion downwardly extending from a periphery thereof, and a barbed fastening portion horizontally extending from a distal end of the connecting portion; wherein
    the vertical channel of said slot defines a width to be larger than a lengthwise dimension of said fastening portion so as to allow said fastening portion to be initially downwardly inserted thereinto and successively move horizontally to reach a final position in said horizontal channel; wherein
    said reinforcement plate is immovable relative to the base in use when said integrated circuit module is assembled to or disassembled from the connector.

8. The electrical connector as described in claim 7, wherein said reinforcement plate defines a planer dimension similar to that of the base.

9. The electrical connector as described in claim 7, wherein said horizontal channel downwardly communicates with the exterior via another vertical channel.

\* \* \* \* \*